United States Patent [19]

Wehrmann

[11] 3,838,413

[45] Sept. 24, 1974

[54] CIRCUIT ARRANGEMENT FOR ANALOG-TO-DIGITAL CONVERSION OF MAGNITUDES OR SIGNALS IN ELECTRICAL FORM

[75] Inventor: Wolfgang Wehrmann, Vienna, Austria

[73] Assignee: Norma Messtechnik Gesellschaft m.b.H., Vienna, Austria

[22] Filed: July 31, 1972

[21] Appl. No.: 276,385

[30] Foreign Application Priority Data

Aug. 3, 1971 Austria .............................. 6780/71

[52] U.S. Cl...... 340/347 AD, 235/150.3, 235/150.5, 307/260, 307/269, 328/59, 328/63

[51] Int. Cl. ........................................... H03k 13/02

[58] Field of Search.......... 179/15 AP; 340/347 AD; 235/181, 150.5, 150.3; 328/59–63; 307/260, 269

[56] References Cited

UNITED STATES PATENTS

| | | | |
|---|---|---|---|
| 3,180,939 | 4/1965 | Hall | 340/347 AD |
| 3,349,390 | 10/1967 | Glassman | 340/347 AD |
| 3,404,261 | 10/1968 | Jespers et al. | 235/181 |
| 3,419,819 | 12/1968 | Murakami | 179/15 AP |
| 3,495,076 | 2/1970 | Jespers et al. | 235/150.5 |
| 3,500,247 | 3/1970 | Sekimoto | 340/347 AD |
| 3,530,459 | 9/1970 | Chatelon | 179/15 AP |
| 3,612,845 | 10/1971 | Lawlor | 235/150.3 |
| 3,725,677 | 4/1973 | Lawlor | 328/59 |

FOREIGN PATENTS OR APPLICATIONS

| | | | |
|---|---|---|---|
| 1,184,652 | 3/1970 | Great Britain | 235/150.5 |

OTHER PUBLICATIONS

Poppelbaum et al., Stochastic Computing Elements and Systems, AAPS Conference Proceedings, 1967, Fall Joint Computer Conference, pp. 635/644.

Quarterly Technical Progress Report, Jan.–Feb.–March, 1965, Dept. of Computer Science, Univ. of Illinois, pp. 25–33.

Quarterly Technical Progress Report, Oct.–Nov.–Dec., 1965, Dept. of Computer Science, Univ. of Illinois, p. 12–14.

*Primary Examiner*—Felix D. Gruber
*Attorney, Agent, or Firm*—Cushman, Darby & Cushman

[57] ABSTRACT

Apparatus for converting analog electrical signals to a digital electrical signal wherein the statistical probability of a predetermined state for the digital output signal is a predetermined function of the analog input signals to provide digital signals having improved transmission capabilities. A continuously varying threshold electrical signal having a predetermined statistical distribution of amplitudes is compared to the analog input signal and the result of such a comparison is used to produce and control the digital output signal such that the statistical probability of a given digital state is a predetermined function of the analog input corresponding to the predetermined statistical distribution of amplitudes of the continuously varying threshold signal.

15 Claims, 32 Drawing Figures

Figure 1:
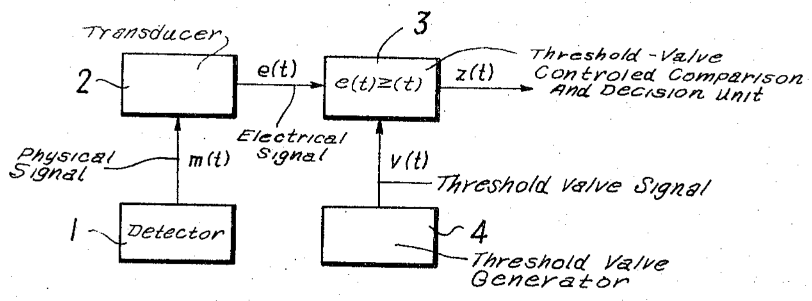

CIRCUIT ARRANGEMENT FOR ANALOG-TO-DIGITAL CONVERSION OF MAGNITUDES OR SIGNALS IN ELECTRICAL FORM

The invention concerns a circuit arrangement for analog-digital conversion of electrical magnitudes or signals by means of threshold-value controlled comparison and decision units and associated threshold-value generators.

Devices for analog-digital conversion are known. The presently most modern kind of analog-digital conversion rests on pulse code modulation (PCM). Examples will be found in the German AUSLEGESCHRIFTEN 1029711, 1939975, 2036557, 2040339 and 2041077 and in the French Pat. 6926970. PCM is a process widely used in many branches of electronics, in which quantized analog measured values are converted into the bindary code. Thus all the advantages of the bindary code are being made use of. This requires increasing the time scale of the binary signal by the selected number of bits per analog value and the bit groups must be properly recognized and assessed. If one bit in the group is subject to interference or incorrectly valued, the error may affect almost the entire scope of the measurements. Hence synchronization is a central and ticklish problem for the PCM process. In addition, there is fairly high expenditure in the modulators and demodulators that are required, particularly if the formation of the characteristics of the input signals is related to the analog-digital conversion.

Another drawback in analog-digital conversion is that because of the different bit values, PCM interferences are percentagewise more pronounced for small analog values than for large ones.

Aside from PCM, the pulse frequency processes such as in the Austrian Pats. 254.973, 260.345, 275.649, 278.159 and 283.490, or in the German Auslegeschriften 1011.327, 1022.127, 1028.469, 1029.711, 1062.583, 1122.417, 1288.488 and 1762.570 may be considered as being of the state of the art. Common to all pulse frequency processes is that the pulse frequency is unambiguously related to the measured value and that each change in measurement causes a corresponding change in pulse frequency. Thus a given frequency range is associated with a given range of measurements. The required frequency range is determined by the desired accuracy of conversion, the converter's frequency stability and the magnitude of the interferences. Associating measured values with pulse frequencies can be achieved in several ways. When measuring rotating parts, the transmitters generate continuous pulse series as a function of angular speed with variable pulse frequency. In other processes, RC circuits of astable multivibrators are controlled as a function of the measured value, so that a functional relationship is obtained between measured value and pulse frequency. Aside from transmitter problems, the pulse frequency process suffers from two drawbacks per se and of essential nature:

First, the pulse signal's power spectrum changes as function of the measured value and hence its required bandwidth within wide limits. This increases synchronization problems and interference difficulties in signal transmission and entails higher costs.

Second the frequency constant of the measured-value converter is wholly absorbed in the accuracy of measurement.

The object of the invention avoids these said drawbacks of the known processes and allows analog-digital conversion of magnitudes and signals in a new and advantageous manner.

The invention essentially consists in providing a combining network in a circuit such as initially mentioned, in that each comparison and decision unit comprises an ergodic converter (ergodic conversion is also explained in my allowed copending U.S. Pat. application No. 276,315, filed July 31, 1972, the disclosure of which is hereby incorporated by reference and in that the threshold-value generators are provided with output potentials with predetermined amplitude frequencies of occurrence, (i.e., a predetermined statistical probability distribution of the possible amplitudes) where a binary pulse sequence or series with a pulse or pulse-length frequency of occurrence related to the signal-characteristics appears at the output of the combining network.

This kind of embodiment provides the following advantages with respect to conventional kinds of analog-digital conversion:

high immunity to interference, high discrimination effectiveness with respect to noisy analog values, complete immunity to bit frequency fluctuations and synchronous or asynchronous analog value recovery.

Figure 2A:
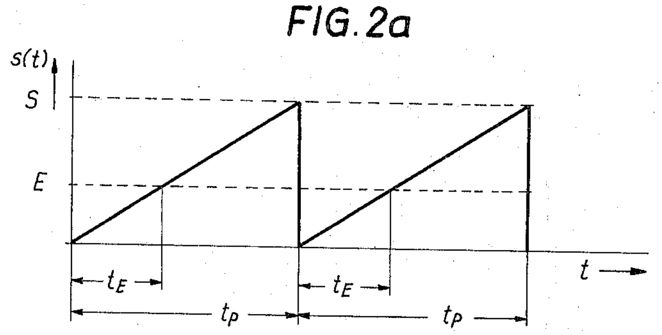
Figure 2B:
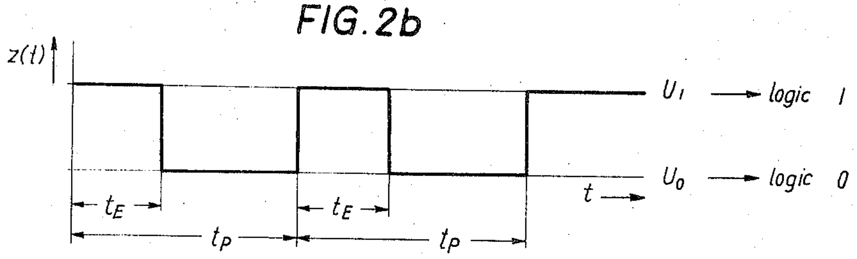
Figures 4A, 4B, 4C, 4D, 4E:
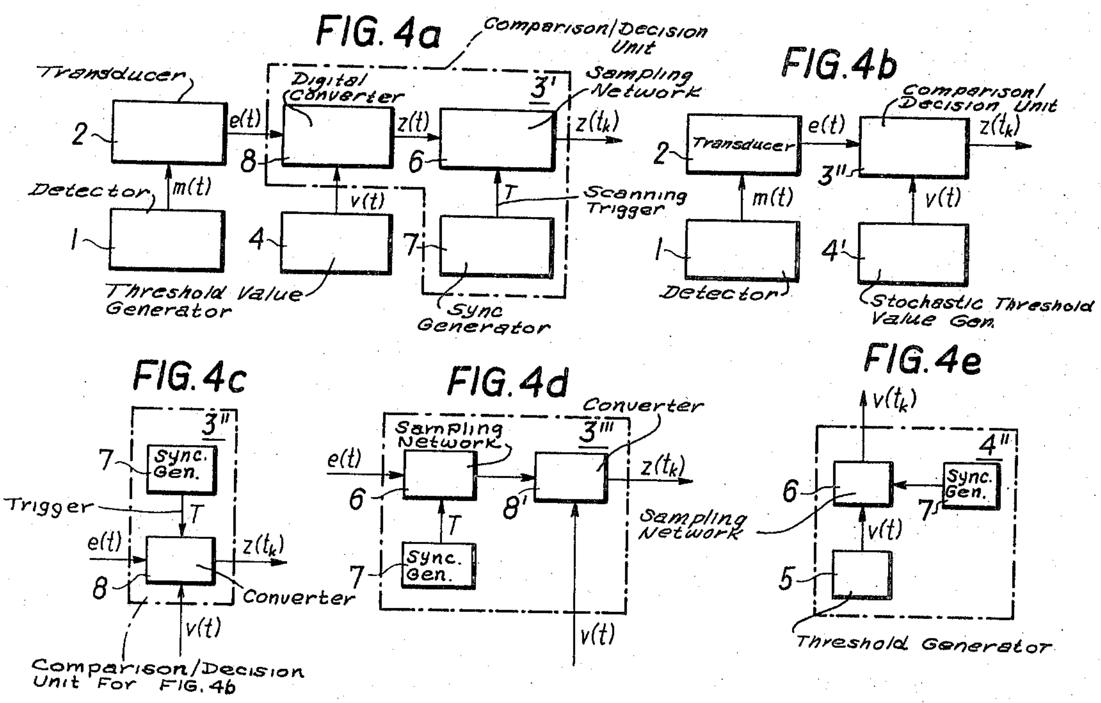
Figures 5A, 5B, 5C:
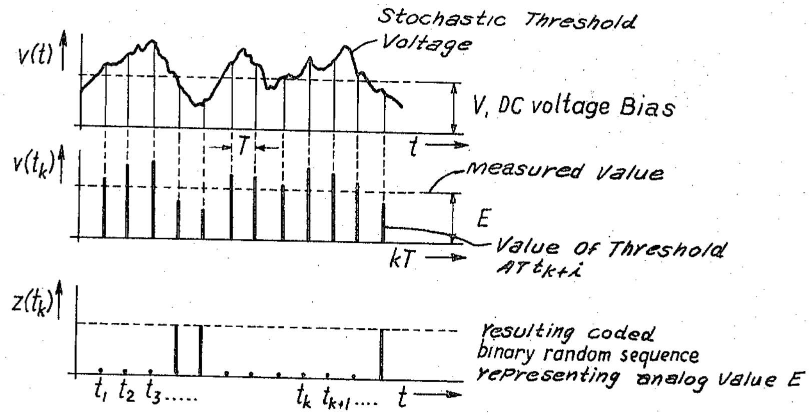
Figure 6:
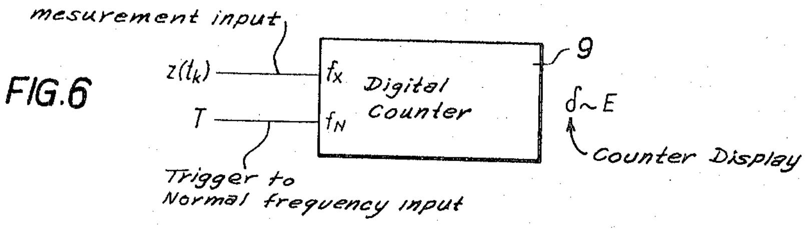
Figures 7A, 7B, 7C, 7D, 7E:
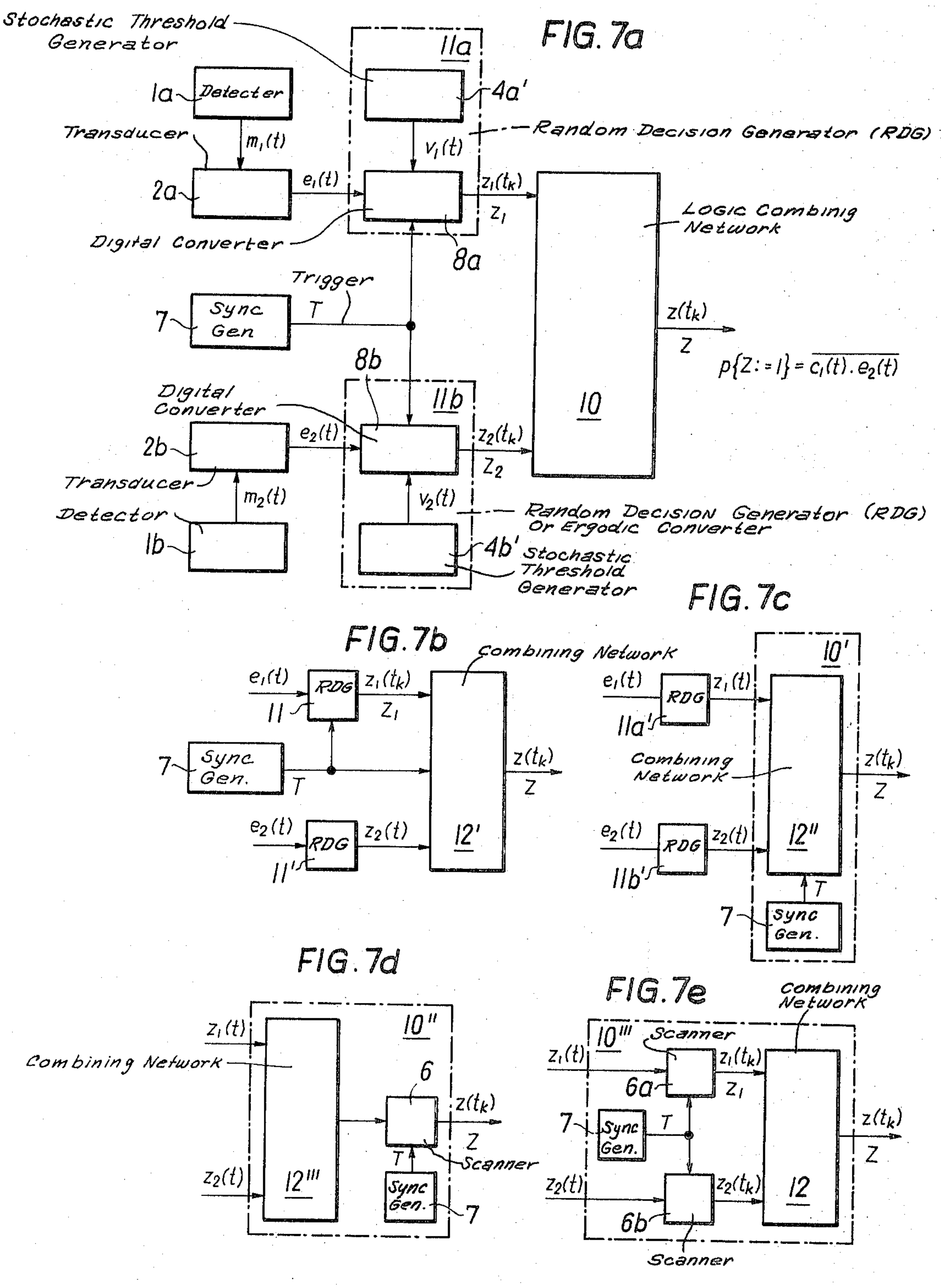
Figures 8A, 8B:
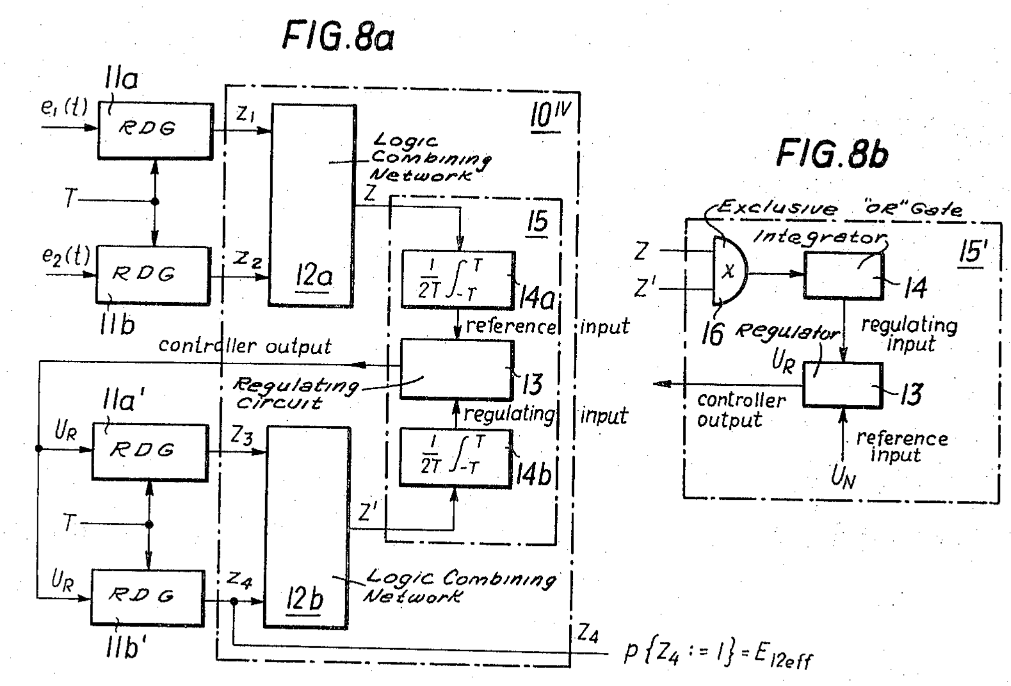
Figure 9:
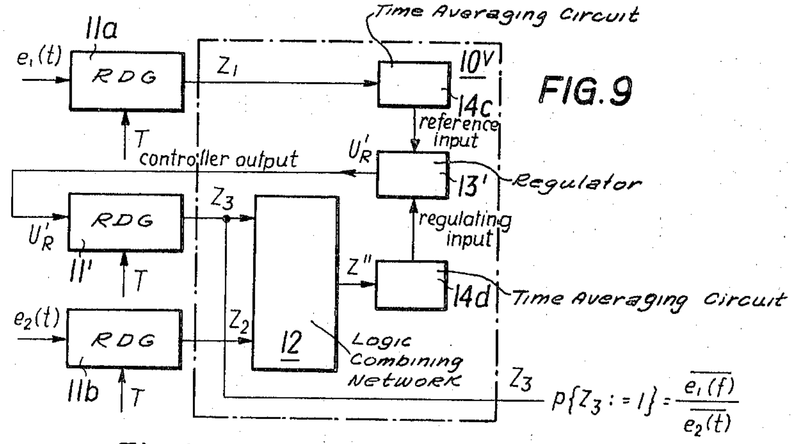
Figures 11A, 11B:
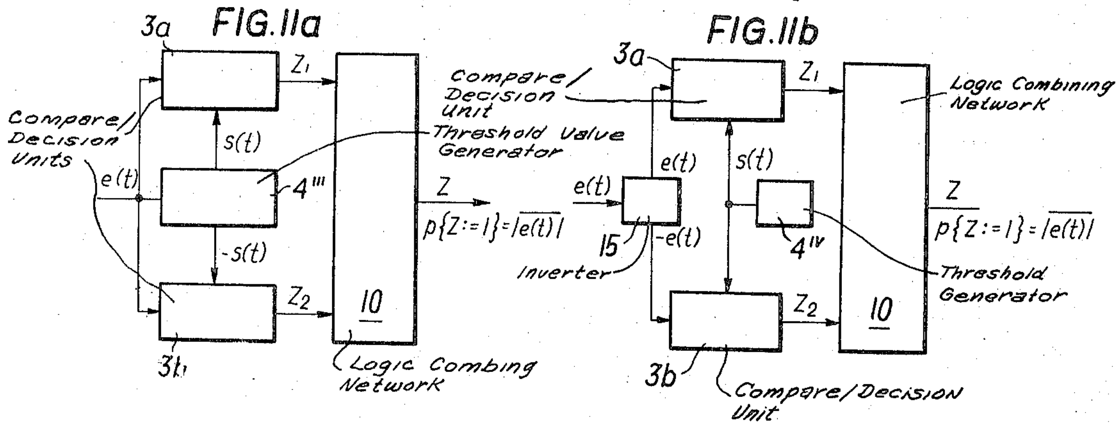
Figures 10, 13:
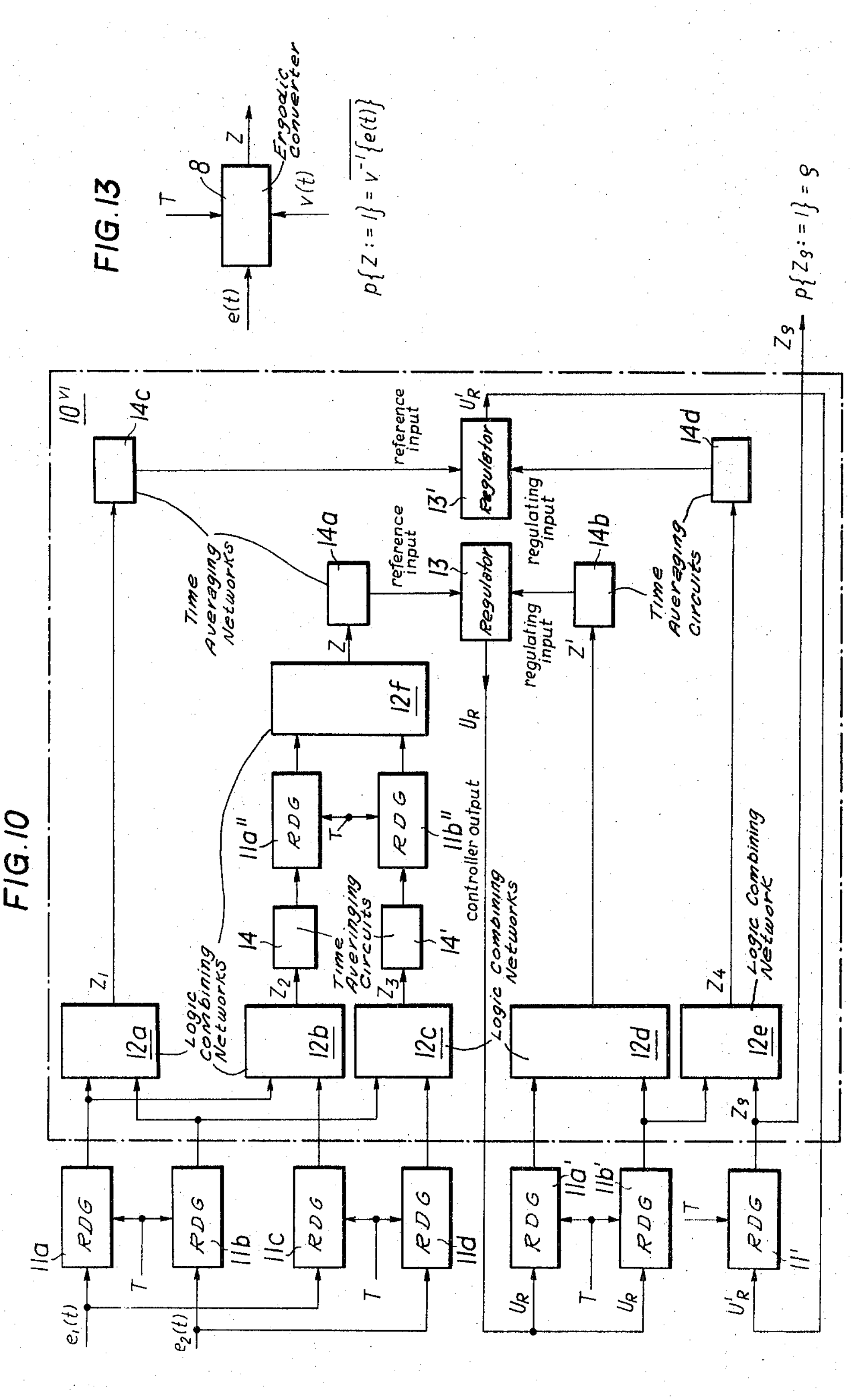

The drawing illustrates the invention by means of examples of execution and in diagrammatic form. FIG. 1 shows a block diagram of the principle of the invention for a circuit arrangement and FIGS. 2*a* and 2*b* show the associated signals with time; FIGS. 3*a* through 3*d* show further signals as functions of time for the elucidation of the operation of the circuit arrangement; FIGS. 4*a* through 4*e* show further circuit arrangements or modifications in the circuit of FIG. 1 and FIGS. 5*a* through 5*c* are diagrams explaining signal processing with those arrangements; FIG. 6 is an additional measurement arrangement for digital display of the result. FIG. 7*a* shows a combination of two circuit arrangements according to FIG. 4*b* into a new arrangement and FIGS. 7*b* through 7*e* show variations of same; FIG. 8*a* shows a circuit arrangement for the analog-digital conversion of roots from time averages and FIG. 8*b* shows a variation of same; FIG. 9 is a circuit arrangement for the analog-digital conversion with functional formation of quotients of time averages. FIG. 10 is a circuit arrangement for binary representation of the correlation coefficient. FIGS. 11*a* and 11*b* show circuit arrangements for analog-digital conversion with functional formation of the DC value, and FIGS. 12*a* through 12*d* show associated diagrams for the explanation of signal processing; FIG. 13 illustrates a circuit arrangement for the analog-digital conversion of signal transforms.

The circuit arrangement shown in FIG. 1 comprises a detector 1 transmitting for instance a magnitude $m(t)$ such as a force, acceleration potential, current or any other mechanical, optical, acoustic or electrical magnitudes. The general-case physical magnitude $m(t)$ is transduced into an electrical magnitude $e(t)$ by means of a transducer 2 and is fed in this form to a threshold-value controlled comparison and decision unit 3. The latter compares the magnitude $e(t)$ with the threshold-value $v(t)$, which is generated by the threshold-value generator 4, and the decision is made, for which value of $t$ the inequality (1) will be satisfied, $$e(t) \geqslant v(t) \qquad 1.$$

FIGS. 2*a* and 2*b* explain the corresponding decision and comparison process for the simplifying assumption that $e(t) = E$, a constant potential and that $v(t) = s(t)$, a saw-tooth potential. FIG. 2*a* shows the time-course of the saw-tooth potential $s(t)$ with its maximum value S and the time-invariant magnitude E. For the assumptions of FIGS. 2*a* and 2*b*, the potential level $U_1$ will appear at the output of function unit 3 as long as $$E \geqslant s(t) \qquad 2.$$

is satisfied, otherwise the potential level $U_o$ will. If according to FIG. 2*b*, the potential $U_1$ is associated with the state "logic 1" and the potential $U_o$ with the state "logic 0", then a function $z(t)$ will appear at the output of unit 3, which may be mathematically described as a sequence or series of the states "logic 1 and 0." Below the states logic 1 and logic 0 for the sake brevity will be termed states 1 and states 0. The series $z(t)$ is concretely related with inequality (2) corresponding to FIG. 2*b* and consists of a periodic sequence of states 0 and 1. The relative frequency of occurrence of state 1 in $z(t)$ is directly proportional to the value $t_E$. For sufficiently long time of observation, and in the sense of probability theory, the relative frequency of occurrence for proper accuracy of measurement is equal to its corresponding probability. FIG. 2*a* readily shows that the frequency of occurrence of state 1 in $z(t)$ is proportional to the time $t_E$ and therefore the probability of state 1 in $z(t)$, namely $p(Z:=1)$, may be computed from $$p(Z:=1) = t_E/t_p = E/S \qquad 3$$

which provides the direct proportionality between the probability of state 1 and the value $E$.

In the sense of information theory, the function $z(t)$ is an electrical binary signal with all the advantages of binary signal shapes or forms. A binary signal $z(t)$ appears at the output of unit 3, which satisfies eq. (4) for the relations shown in FIG. 2*b*, $$Mt_p = St_E \qquad 4.$$

where $M$ is the time-average of the series $z(t)$. Then one further obtain $$M/S = t_E/t_p = E/S \qquad 5.$$

so that $M$ is identical with $E$. In summary therefore, the circuit arrangement of FIG. 1 associates a binary series $z(t)$ with a constant analog value $E$, where the time-average value of $z(t)$ is proportional to the probability $p(Z:=1)$ and hence to the magnitude $E$. This kind of circuit arrangement according to the invention therefore acts as an analog-digital converter delivering a binary signal $z(t)$ from which the measured value may be particularly easily recovered in analog fashion and which further is provided with high immunity to interference as compared to the binary signal in conventional analog-digital converters. This immunity is related to the already mentioned conversion of the analog value into a state probability of the binary signal $z(t)$. In this kind of analog value conversion the interferences will be the less effective, the more pulse events in $z(t)$ will be used in the recovery of the analogous value. It is seen from the fairly simple mathematical assumptions that the linear relationship between the probability $p(Z:=1)$ and the value $E$ comes into being because of the linear saw-tooth curve. Mathematically this is equivalent with a constant amplitude spectrum or distribution function of a saw tooth potential. Besides the saw-tooth potential, there are arbitrarily many other functions with a constant amplitude frequency of occurrence distribution and which obviously would also apply to the above considerations. An example is the potential $s'(t)$ in FIG. 3*a* and the corresponding shape of the series $z(t)$ in FIG. 3*b*. Nor need the threshold-value potential $v(t)$ be a periodic function. One may conceive the threshold-value potential $v(t)$ as being made up of partial sections of different saw-tooth potential segments amounting to a resultant curve $s''(t)$ which only eq. (3) must satisfy at all times This is shown by FIGS. 3*c* and 3*d*.

Figures 3A, 3B, 3C, 3D:
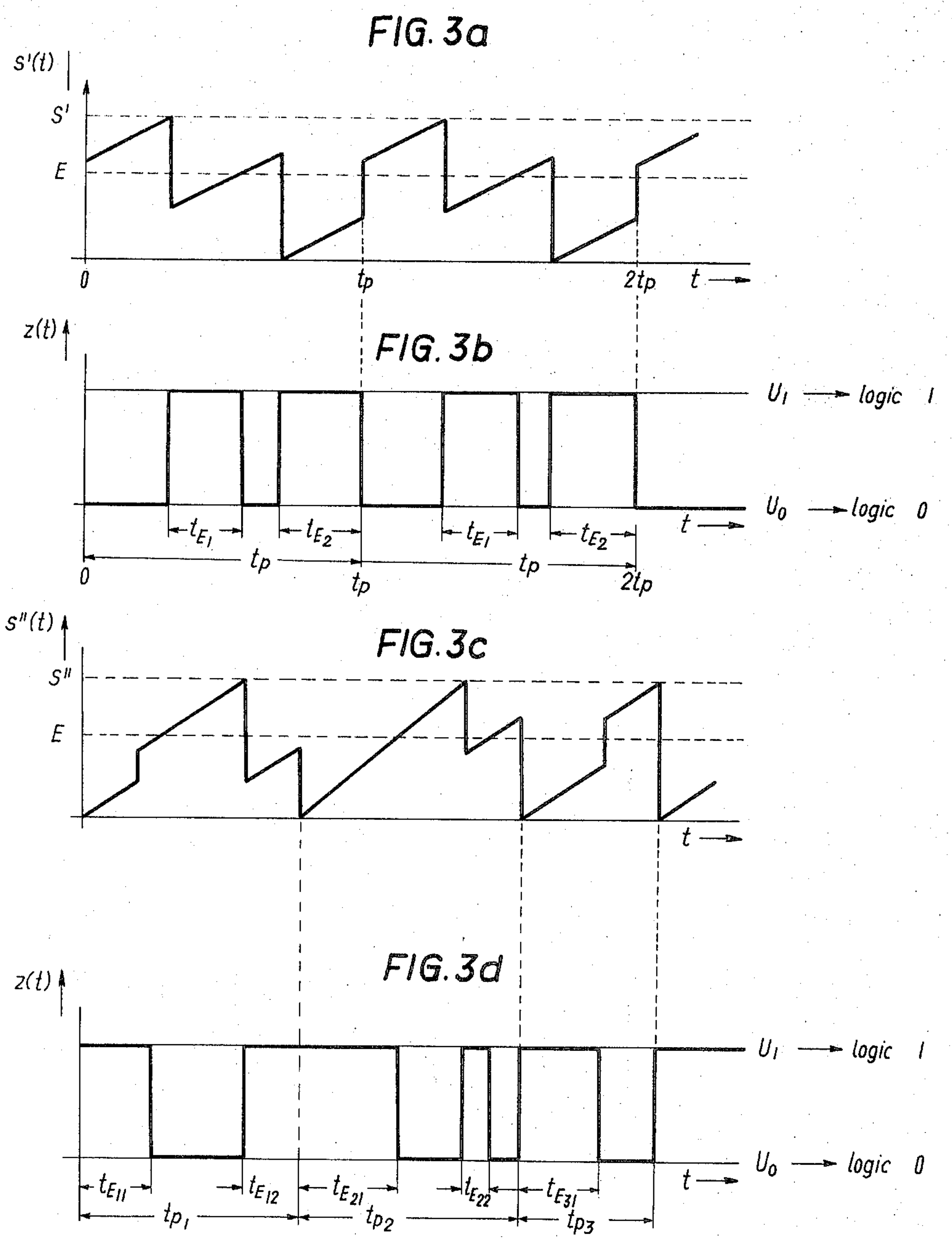

For the case of signal processing according to FIGS. 3*a* and 3*b*, eq. (3) will be valid for $$p(Z:=1)=(t_{E1} + t_{E2})/t_p = E/S \qquad 6.$$

and if according to FIGS. 3*c* and 3*d*, in the form $$p(Z:=1) = \epsilon\, t_{Eij}/t_{pi} = E/S \qquad 7.$$

Lastly, a stochastic generator too may be used for generating threshold-value potentials, where the stochastic output signal $v(t)$ is of constant amplitude spectrum.

When FIG. 1 was explained, an analog-digital conversion was described which was particularly meant for the analog recovery of $E$.

Another form of the binary signal $z(t)$ is better suited for the recovery in digital form of the measured value $E$. Since according to eq (3) the value of $E$ is proportional to the probability of occurrence of the state "logic 1" in $z(t)$, namely $p(Z:=1)$, the digital recovery of $E$ amounts to a digital measurement of the probability $p(Z:=1)$. In order to ensure this, unit 3 in FIG. 1 may be modified according to FIG. 4*a* to unit 3' and be provided with a synchronous generator 7, with a converter 8 and with a scanning network 6 comprising a conventional triggered sampling network as will be appreciated. Then the series $z(t)$ will be scanned at trigger T from synchronizing generator 7. Then the scanned or sampled values $z(t_k)$, where $k = 0.1 \ldots,$ form a binary pulse series of which the relative pulse frequency of occurrence is proportional to E. FIG. 4*b* shows a variation for the generation of the binary pulse sequence $z(t_k)$.

The signal processing associated with FIG. 4*b* will be explained with the help of FIGS. 5*a* through 5*c* and with respect to a stochastic threshold value potential $v(t)$ generated by generator 4'. FIG. 4*b* shows the detector 1 which provides the measured value $m(t)$ that will be converted into an electrical magnitude $e(t)$ in transducer 2. The following threshold-value controlled comparison and decision unit 3'' comprises the converter 8 which is fed from the magnitude e(t) or in special cases from E, from the threshold-value potential $v(t)$ delivered by the stochastic generator 4' and from the synchronizing generator 7, as shown in more detail in FIG. 4*c*. Therefore the comparison and decision process in unit 3'' occurs at discrete trigger times $t_k$ determined by the synchronizing clock generator 7. In order to simplify electronically the comparison and decision process, the potential $v(t)$ is biased by means of a sufficiently large DC potential V, so that only decisions regarding one polarity are required. This previously mentioned bias for the sake of simplicity will further below also be denoted by $v(t)$ and is shown in FIG. 5*a*. Unit 3'' compares the magnitude of $E$ with the potential $v(t)$ only at trigger times $t_k$. This means with respect to signal processing that the magnitude $E$ will be compared with the threshold-value potential at the trigger times, that is with $v(t_k)$, as shown in FIG. 5*b*. Then unit 3'' will make decisions in the form of pulses or pulse-gaps at the times of triggers. A pulse will always appear at the output of unit 3'' if the threshold-value potential $v(t)$ is less than $E$ at a trigger time, otherwise there will be a pulse-gap. The pulses and pulse-gaps at the output of unit 3'' form a binary random series $z(t_k)$, which is shown in FIG. 5*c*. If the pulse event is associated with the state "logic 1" and the event of pulse-gap with the state "logic 0," then the relative frequency of occurrence of the pulses in $z(t_k)$ will also indicate the relative frequency of occurrence of the state "logic 0" in $z(t_k)$. Similar considerations apply to the association of pulse gaps and state "logic 0." Again, in the sense of the theory of probability, a relative frequency of occurrence such as that of state 1 in $z(t_k)$ for appropriate accuracy of measurement and sufficient length of observation will be equal to the corresponding probability $p(Z:=1;t=t_k)$. It will be shown next that for the case of signal processing of FIGS. 5*a* through 5*c*, there is a linear relationship between the probability $p(Z:=1;t=t_k)$ and $E$. This is best shown by two limiting cases.

If the value of $E$ is so large that it exceeds $v(t)$ everywhere, then unit 3'' will deliver only pulses at the trigger times $t_k$ and the series $z(t_k)$ will consist solely of logic 1-decisions. In other words, the state 1 will occur in the series $z(t_k)$ at those trigger times with probability $p(Z:=1;t=t_k) = 1$. If on the other hand the value of $E$ is so small that at every trigger time $v(t)$ exceeds $E$, then the series $z(t_k)$ will consist solely of zero-decisions, that is, the probability for state 1, $p(Z:=1;t=t_k)$ is zero. If $E$ lies between the two above values, then there will be a number of logic 0 and 1 decisions depending on the value of $E$ in the series of $z(t_k)$. This number of 1-decisions and therefore its relative frequency of occurrence rises with the value of E, thus is a function of it. For the case of a stochastic threshold-value potential $v(t)$ with constant amplitude spectrum, this dependency is linear as will be shown by the brief ensuing mathematical considerations. The probability of a pulse in $z(t_k)$, $p(Z:=1;t=t_k)$ besides the value of $E$ also depends also on the amplitude frequency of occurrence of the threshold-value potential $v(t)$, namely of $p(v)$, and generally may be expressed as $$p(Z:=1;\ t=t_k)=\int_0^e p(v)dv \qquad (8)$$

Under the assumptions of the object of the invention that there is a constant amplitude spectrum, one obtains $$p(v) = 1/H = \text{constant.}$$

Therefore eq. (8) will yield, $$p(Z:=1;t=t_k) = E/H \qquad 8a.$$

This provides the value $E/H$ and indicates the linear relationship between the probability for state 1 in the series $z(t_k)$ at the trigger times, on one hand, and the value $E$ on the other.

The binary series $z(t_k)$ is a pulse series in which, as explained above, the probability of a pulse, $p(Z:-1;t=t_k)$ is proportional to $E$. This form of converting an analog value $E$ into a synchronized binary sequence $z(t_k)$ is particularly suited for digital recovery of $E$ from the sequence $z(t_k)$ by means of digital measurement of the probability $p(Z:=1;t=t_k)$. This measurement is shown in principle in FIG. 6 which illustrates its simplicity. The sequence $z(t_k)$ is fed into the measurement input $f_x$ and trigger $T$ into the normal frequency input $f_N$ of a digital counter 9. The counter display δ is a direct measure of the probability $p(Z:=1;t=t_k)$ and therefore of the value E. FIG. 4*d* shows a further variation 3''' for the threshold-value controlled comparison and decision unit 3, and FIG. 4 *e* a variation of the threshold-value generator 4.

In the modification shown in FIG. 4*d* the electrical input AC magnitude $e(t)$ is fed to a sampling network 6 which is clocked (triggered) by a clock generator 7. The sampled values of $e(t)$ thereby generated are fed from the output of sampling network 6 to a converter 8' in which they are being compared with a varying threshold signal $v(t)$ with respect to their amplitude, and which converter thereby generates a binary random sequence $z(t_k)$. Sampling network 6, clock generator 7 and converter 8' together form a modified comparison and decision unit 3''' being controlled by input magnitude $e(t)$ and threshold signal $v(t)$, and delivering at its output the binary random sequence $z(t_k)$.

FIG. 4*e* shows a modification of the threshold signal generator which includes a stochastic generator 5, the output signal $v(t)$ of which is fed to a sampling network 6. Sampling network 6 is clocked (triggered) by a clock generator 7 and delivers sampled threshold values $v(t_k)$ at its output. Stochastic generator 5, sampling network 6 and clock generator 7 cooperate in the manner described and together form a threshold signal generator 4''.

Eq. (8) shows the influence of the amplitude spectrum of the threshold-value potential $v(t)$, namely $p(v)$, on the functional relationship between $E$ and probability $p(Z:=1;t=t_k)$. Upon integrating as below, one obtains $$\int_0^{\epsilon} p(v)dv=P(E)-P(O) \qquad (9)$$

which is the difference between the values of the so-called probability distribution function of potential $v(t)$, i.e, $P(v)$, at the limits of integration. According to definition, $P(0) = 0$, so that from eqs. (8) and (9), one obtains, $$p(Z:=1;t=t_k) = P(E) \qquad 10.$$

The probability spectrum $P(v)$ thus acts as the transform for $E$. This circumstance may be put to use for certain characteristic of measurements.

In the sense of probability theory, the periodic functions too have probability spectra. These correspond to the inverse functions of the periodic functions. Thus even complicated characteristics may be achieved, provided the inverse function be simple. This applies for instance to the logarithm or the root formation, where the inverse functions are resp. the exponential and the parabola. If the assumption made so far no longer is satisfied, namely that E is constant, and if the measured value $e(t)$ is time varying, as shown in FIG. 1, then two cases must be distinguished for the analog-digital conversion of this invention. In the first case the fluctuations in $e(t)$ are so slow compared to the time-values $t_{Eij}$ and $t_{Pi}$ from eq. (7) and FIG. 3*d*, that the measured value $e(t)$ can be considered quasi-constant during the time of measurement $t_w$ with respect to the probability $p(Z:=1)$ or $P(Z:=1;t=t_k)$. Applied to the case of signal processing as in FIGS. 3 and 5, this means that for periodic threshold-value potentials $v(t)$, sufficient numbers of periods must have elapsed, and for stochastic threshold-value potentials $v(t)$, enough time must have elapsed, in the synchronized case according to FIG. 4*a* through 4*d* enough triggers must have elapsed, in order that the probabilities $p(Z:=1)$ or $p(Z:=1;t=t_k)$ may be determined with appropriate accuracy of measurement from the series $z(t)$ or $z(t_k)$. These probabilities synchronously fluctuate with the measured value $e(t)$. Thus the probabilities $p(Z:=1)$ or $p(Z:=1;t=t_k)$ are proportional to the instantaneous values of $e(t)$, where, as already mentioned, the fluctuations in $e(t)$ are so slow that $e(t)$ is quasi-constant during the measuring time $\Delta t_w$, and thus will satisfy the equation below within the scope of instrument accuracy, $$e(t) = e(t + \Delta t_w) \qquad 11.$$

This limitation is quite feasible in today's remote control and measuring techniques and does not hamper the application. these restrictions drop out for rapidly changing values $e(t)$ when only such given characteristics as DC value, DC component, effective value and other signal characteristics are required to be digitally converted in the sense of this invention.

For the assumptions so far of a constant $E$ of a quasi-constant measured value, it was shown that binary random series may be associated with an analogue value, where the probabilities or the occurrence of state 1 are proportional to a constant measured value or to the instantaneous values of a changing measured value. One may also make use of the arrangements shown in FIGS. 1, 4*a* and 4*b* for rapidly changing values $e(t)$, if the analog-digital conversions of the latter's characteristics are concerned. Then a binary random series will be produced each time, for which the probability of occurrence of the logic state 1 is proportional to the particular signal characteristic. This will be shown by five examples. For reasons of simplification already mentioned it will be assumed that the measured values too have been biased by the same amounts and that therefore only decisions with respect to one polarity are required. The first example will deal with an analog-digital conversion for the case of a linear average or DC value of a measured value $e(t)$, when synchronized pulses series are being used with a constantly distributed threshold-value potential $v(t)$.

Starting with the circuit arrangement of FIG. 4*b*, then one may express eq. (8) in a modified form for rapidly varying magnitudes $e(t)$ $$p(Z:=1;\ t=t_k)=\int_0^{e(t_k)} p(v)\,dv=\frac{e(t_k)}{H}=E_k/H \qquad (12)$$

The relationship of eq. (12) indicates that the probability of a pulse event at time $t_k$ in the series $z(t_k)$ is proportional to the instantaneous value $E_k$ of $e(t)$ at that moment. The measurement of a probability may only be effected by observing the relative frequency of occurrence over a sufficiently long time, and in this case, by observing the pulse frequency over many triggers. Then one obtains a value $p_{1N}$ which is averaged over $k$ for the probability $p(Z:=1;t=t_k)$, namely $$p_{1N}=\frac{1}{2N+1}\sum_{k=-N}^{N} p(Z:=1;\ t=t_k)=\frac{1}{H(2N+1)}\sum_{k=-N}^{N} e(t_k) \qquad (13)$$

which, for sufficiently large $N$ and adequate accuracy of measurement, will provide the probability of a pulse in $z(t_k)$, $p_1$. Then in the limit the value of $p_1$ becomes $$p_1=\lim_{N\to\infty} p_{1N}=\frac{1}{H}\lim_{T\to\infty}\frac{1}{2T}\int_{-T}^{T} e(t)\,dt=\frac{\overline{e(t)}}{H} \qquad (14)$$

Except for a multiplicative constant, this value is the time average $e(t)$, or the linear average or DC value of $e(t)$. This relationship holds for deterministic as well as for stochastic signals $e(t)$. To round out the plausibility of this result, it will be observed that each amplitude of a stationary stochastic signal will occur with a relative frequency corresponding to its probability over a sufficiently long time of observation. The averaging in eq. (13) extends over these relative frequencies. In summary, one may state:

If the circuit arrangement of the invention such as in FIG. 4*b* is controlled with a rapidly varying magnitude $e(t)$, then one will obtain a binary random series in which a pulse event will occur with a relative frequency proportional to the linear average of the measured value.

If two circuit arrangements from FIG. 4*b* are used and combined into a new arrangement, as in FIG. 7*a*, then one may achieve an analog-digital converter providing a binary random series in which a pulse even will occur with relative frequency that is proportional to the linear average of the product of the two measured values $e_1(t)$ and $e_2(t)$. This circuit arrangement operates in short as follows: similarly as in FIG. 4*b*, units 1*a* and 2*a* in FIG. 7*a* form a measured signal $e_1(t)$ which is passed on to converter 8*a;* the latter is also energized from the stochastic generator 4'*a* and synchronizing generator 7; the functional elements 4'$a$ and 8$a$ are combined into one unit 11$a$ which will be called the random decision generator (RDG); RDG 11$a$ is triggered by an impulse T and controlled by the measured signal $e_1(t)$; in similar fashion, a measured signal is formed, which is $e_2(t)$, by means of units 1$b$ and 2$b$ which controls RDG 11$b$; at the outputs of RDG 11$a$ or RDG 11$b$ occur synchronized binary random series $z_1(t_k)$ or $z_2(t_k)$; these two binary random sequences for the sake of brevity will be termed $Z_1$ and $Z_2$.

The threshold-value potentials $v_1(t)$ and $v_2(t)$ being assumed statistically independent, then the random sequences $Z_1$ and $Z_2$ too will be statistically independent. If the sequences $Z_1$ and $Z_2$ are combined conjunctively by means of a combining network 10 into a new series Z, then according to the multiplication theorem of probability theory, the probability of a pulse in Z is equal to the product of the probabilities of a pulse in $Z_1$ and $Z_2$. Brief consideration will show that an antivalent combining of the binary series $Z_1$ and $Z_2$ is preferable, since then those constants will drop out, which are determined by the signal biases. The formation of the resultant series Z will therefore be explained in greater detail for the case of the antivalent connection.

If the probabilities for 0 and 1 decisions at time $t_k$ in the series $Z_1$ are denoted by $p_{1k}(O)$ and $p_{1k}(1)$ resp., then because of the similar notations for the corresponding probabilities in $Z_2$ and Z for antivalent connection for series $Z_1$ and $Z_2$ into Z yields the following system of equations, $$p_k(0) = p_{1k}(1)p_{2k}(1) + p_{1k}(0)p_{2k}(0) \quad p_k(1) = p_{1k}(1)p_{2k}(0) + p_{1k}(0)p_{2k}(1) \qquad 15.$$

Because of previous simplification of decision, the threshold value potential $v(t)$ was imparted the bias V and therefore $v_1(t)$ and $v_2(t)$ show the biases $V_1$ and $V_2$ resp. In order to place the signals $e_1(t)$ and $e_2(t)$ into the modulation ranges corresponding to $v_1(t)$ and $v_2(t)$ resp., it will be assumed for the sake of simplicity that the biases in $e_1(t)$ and $e_2(t)$ are identical with $V_1$ and $V_2$ resp. From the fundamental probability relation, $$\int_0^{V_{max}} p(v)\,dv = 1 \qquad (16)$$

one obtains, assuming that $p(v_1) = 1/H_i$, that $$v_{i\ max} = H_i = 2V. \qquad 17.$$

where $i = 1,2$; the quiescent point of an electronic circuit is best placed at the center of its modulation domain. From eqs. (12) and (17), and from the instantaneous values $E_{ik} = H_i/2 + e_i(t_k)$, with $i$=1,2, one obtains the system of equations below for the probabilities of eq. (15), namely $$p_{1k}(1) = 1 - p_{1k}(0) = E_1/H_1 = ½ + e_1(t_k)/H_1 \quad p_{2k}(1) = 1 - p_{2k}(0) = E_2/H_2 = ½ + e_2)/H_2 \quad p_k(1) = 1 - p_k(0) = ½ - [e_1(t_k)/H_1]\,[e_2(t_k)/H_2] \qquad 18.$$

The average relative frequency of occurrence for a pulse in series Z in the limiting case leads to infinite averaging of the corresponding probability $p_1$ in the form $$p(1) = \lim_{N\to\infty} \frac{1}{2N+1} \sum_{k=-N}^{N} p_k(1) = \frac{1}{2} - \frac{1}{H_1H_2} \lim_{T\to\infty} \frac{1}{2T} \int_{-T}^{T} e_1(t)e_2(t)\,dt \qquad (19)$$

and this expression is proportional to the average product of the measured signals $e_1(t)$ and $e_2(t)$ except for a constant. If $e_1(t)$ or $e_2(t)$ are interpreted as being magnitudes proportional to current or voltage, then $p(1)$ is proportional to power.

FIGS. 7$b$ through 7$e$ show variations in the control and embodiment of the combining network 10 according to FIG. 7$a$, depending on whether triggers are used or not for the RDG's. There always appears a resultant binary series at the output of the circuit, in which the relative frequency of the state "logic 1" satisfies eq. (19).

According to FIG. 7$b$ only the RDG, the input of which receives measured signal $e_1(t)$, is being clocked (triggered) by clock generator 7 so that RDG 11 generates a clocked binary random sequence $z_1(t_k)$. A logic network 12' is being clocked (triggered) by clock generator 7, too, so that a logic configuration of the binary random sequences $z_1(t_k)$ and $z_2(t_k)$ is carried out only at predetermined clock instants $t_k$ provided by the clock rhythm T of clock generator 7. Thereby a clocked binary random sequence $z(t_k)$ is delivered at the output of logic network 12'.

According to FIG. 7$c$ non-clocked RDG's 11'$a$ and 11'$b$ are being used. Only logic network 12'' is clocked (triggered) by clock generator 7 (such as by connecting the clock generator output as an input to a multiple input logic gate together with other inputs $z_1(t)$ and $z_2(t)$). Thereby in a similar manner as has been described in connection with FIG. 7$b$ a clocked binary random sequence $z(t_k)$ is delivered at the output of logic network 12''. Logic network 12'' and clock generator 7 together form a combining network 10'.

FIG. 7$d$ shows a logic network 12''' being controlled by two non-clocked binary random sequences $z_1(t)$ and $z_2(t)$. Therefore logic network 12''' at its output delivers a resulting non-clocked binary random sequence which is fed to a sampling network 6. Sampling network 6 is clocked (triggered) by a clock generator 7 and produces a clocked binary random sequence $z(t_k)$. Logic network 12''', sampling network 6 and clock generator 7 together form a combining network 10''.

According to FIG. 7$e$ two non-clocked binary random sequences $z_1(t)$ and $z_2(t)$ are fed to a sampling network 6$a$ and a sampling network 6$b$, resp., both networks being clocked (triggered) synchronously by a clock generator 7. Thereby sampling network 6$a$ produces a clocked binary random sequence $z_1(t_k)$ from binary random sequence $z_1(t)$, and likewise sampling network 6$b$ produces a clocked binary random sequence $z_2(t_k)$ from binary random sequence $z_2(t)$. The clocked random sequences appear at the outputs of the respective sampling networks and are being configurated in a logic network 12 to a resulting binary random sequence $z(t_k)$ delivered at the output of logic network 12. Sampling networks 6$a$ and 6$b$, clock generator 7, and logic network 12 cooperate in the manner described and together form a combining network 10''.

The circuit arrangements in FIGS. 7$a$ through 7$e$ may be expanded for an arbitrary number of measured values. As a further illustration, the analogue-digital conversion for roots will now be explained in accordance with an application according to the invention, as it is obtained from time-averages.

FIGS. 8a and 8b illustrate the operation of the required circuit arrangements. The effective value of a measured value $e(t)$ is the root of the mean square as given by $$E_{\text{eff}} = \sqrt{\lim_{T\to\infty} \frac{1}{2T}\int_{-T}^{T} e^2(t)dt} \quad (20)$$

For the general case of different $e_1(t)$ and $e_2(t)$, one obtains $$E_{\text{eff}12} = \sqrt{\lim_{T\to\infty} \frac{1}{2T}\int_{-T}^{T} e_1(t)e_2(t)dt} \quad (21)$$

Eq. (19) is evident because the analog-digital conversion concerning the value $E_{12\ eff}$ amounts to the generation of a binary random series with a relative pulse frequency corresponding to $p_3(1)$, where $$p_3(1)p_3(1) = p(1) \quad 22.$$

FIG. 8a shows the logical structure for the realization of this binary random series. RDG's 11a and 11b provide binary random sequences $Z_1$ and $Z_2$ which will be combined in the logic network 12a into the resultant output sequence Z, in which the relative pulse frequency corresponds to the probability $p(1)$. A similar analogous circuit arrangement consists of RDG's 11'a and 11'b and provides the binary random sequences $Z_3$ and $Z_4$. These will be combined in network 12 b into the resultant sequence Z'. The input potential $U_R$ of RDG's 11'a and 11'b is generated from a regulating circuit 13 controlled by the average potentials of sequences Z' and Z. The potential average of the pulse series Z acts as command magnitude, that of Z' as regulating magnitude. The regulating circuit 13 generates an adjusting value $U_R$ which is fed back to RDG's 11'a and 11'b and is being kept fed back by regulating circuit 13 until the command and regulating magnitudes are the same. The nature of the circuit indicates that the probabilities for a pulse event in series $Z_3$ and $Z_4$ are the same. Let this probability be denoted by $p_3(1)$. According to the multiplication theorem of probability theory, $p_3(1)$ satisfies eq. (22) where $p(1)$ is the relative pulse frequency in Z'. Thus $p_3(1)$ corresponds to the root of $p(1)$. The binary sequence $Z_4$ has the property of its pulse probability $p_3(1)$ yielding a value proportional to the magnitude $E_{12\ eff}$. Lastly it should be noted that for $e_1(t)$ being identical with $e_2(t)$, $p_3(1)$ is proportional to the effective value of the signal potential.

FIG. 8b shows a variation of the circuit or device 15, deriving from the random series Z and Z' a regulating potential $U_R$. It shows how Z and Z' are being combined by means of an exclusive OR gate 16 into a resultant binary random series, in which a pulse event occurs with a probability that corresponds to the difference in pulse probabilities in Z and Z', assuming these are statistically coupled. The potential $U_N$ corresponds to the reference value 0.

The resulting binary random sequence is fed to an averaging device 14 which therefrom forms a DC signal being fed as a regulating magnitude to a differential amplifier 13. Amplifier 13 compares said regulating magnitude with a voltage $U_N$ which represents a zero reference and acts as a command magnitude. Differential amplifier 13 generates an adjusting magnitude $U_R$ which, similar to the function of the circuit shown in FIG. 8a, is fed as input signal to RDG's 11'a and 11'b. Thereby devices 15 and 15' serve the same purpose.

In FIGS. 8a and 8b elements 14, 14a and 14b are similar elements having an averaging function with respect to time on signals appearing at their inputs which in the present case are the binary random sequences Z and Z'. The symbol $$\frac{1}{2T}\int_{-T}^{T}$$

has been used to designate the function of elements 14a and 14b. Possible embodiments of elements 14, 14a and 14b can be RC (integrating) networks or low pass filters belonging to the state of art. The regulator 13 may be a conventional differential amplifier as will be appreciated. Such differential amplifiers are well known in the art and have been available for many years, for example, as standard integrated circuits such as those known as type 709 or type 741.

FIG. 9 shows a further application of the circuit arrangement of the invention, consisting of the analog-digital conversion with the functional formation of quotients of time averages. The arrangement of FIG. 9 for the sake of simplicity is restricted to the application of quotient formation of the linear average of two signal functions $e_1(t)$ and $e_2(t)$. Channel 11a provides a binary random series $Z_1$ which after time averaging in 14c will control as a command value the regulating circuit 13'. RDG's 11' and 11b provide the series $Z_3$ and $Z_2$ which will be combined in logic network 12 into a resultant series Z'', the combination being antivalent. The time average of Z'' acts as the regulating magnitude for the regulating circuit 13'. The adjusting magnitude $U_R'$ is fed back as an input potential to RDG 11' and will be adjusted till the pulse frequencies of occurrence in series $Z_1$ and Z'' are the same. The relative pulse frequency in series $Z_3$ then provides a magnitude which is proportional to the linear averages' quotient of $e_1(t)$ and $e_2(t)$, in conformity with the previously mentioned multiplication theorem of probability theory. The nature or structure of the circuit arrangement of FIG. 9 may be expanded for an arbitrary number of signal functions.

The correlation coefficient of statistical communication theory, $$\rho = \phi_{12}(0)/\sqrt{\phi_{11}(0)\phi_{22}(0)} \quad 23.$$

where $$\phi_{ij}(o) = \lim_{T\to\infty} \frac{1}{2T}\int_{-T}^{T} e_i(t)e_j(t)dt,\ i,j=1,2 \quad (24)$$

assumes an important role, so that its binary representation with respect to the circuit arrangement of FIG. 10 according to the invention will be briefly discussed. Three binary random series $Z_1$, $Z_2$ and $Z_3$ corresponding to $\phi_{12}(0)$, $\phi_{11}(0)$, $\phi_{22}(0)$ according to eq. (19) and eq. (24) are derived from the input signals $e_1(t)$ and $e_2(t)$ similarly to the signal processing shown in FIG. 7*a*. The time averages of series Z and $Z_1$ act as command magnitudes for the regulating circuits 13 and 13'. An arrangement 14*b* together with the logic network 12*d* provides the regulating magnitude for regulator 13, network 12*d*'s functioning already having been described with respect to root forming. The regulating magnitude for regulator 13' is derived from the series $Z_4$ which results from the logic combination in network 12*e* of the binary random series from RDG's 11' and 11'*b*. the input signals of the RDG's 11' and 11'*b* form the adjusting magnitudes $U_R'$ and $U_R$. The regulating circuit 13 changes its adjusting magnitude $U_R$ until the relative pulse frequency in random series Z' is equal to that of Z. RDG 11'*b* then provides a random series with a pulse frequency of occurrence that is proportional to the value $\sqrt{\phi_{11}(0)\phi_{22}(0)}$. On the other hand, the regulating circuit 13' changes its adjusting magnitude $U_R'$ until the relative pulse frequency in $Z_4$ is equal to that in Z and hence proportional to $\phi_{12}(0)$. Thus RDG 11' provides a random series in which the pulses occur with a relative frequency proportional to $\rho$, frequency proportional to $\rho$.

The next application is an example of execution for the analog-digital conversion with functional DC values. The circuit arrangement is shown in FIGS. 11*a* and 11*b*, and the associated signal processing in FIG. 12.

Figures 12A, 12B, 12C, 12D:
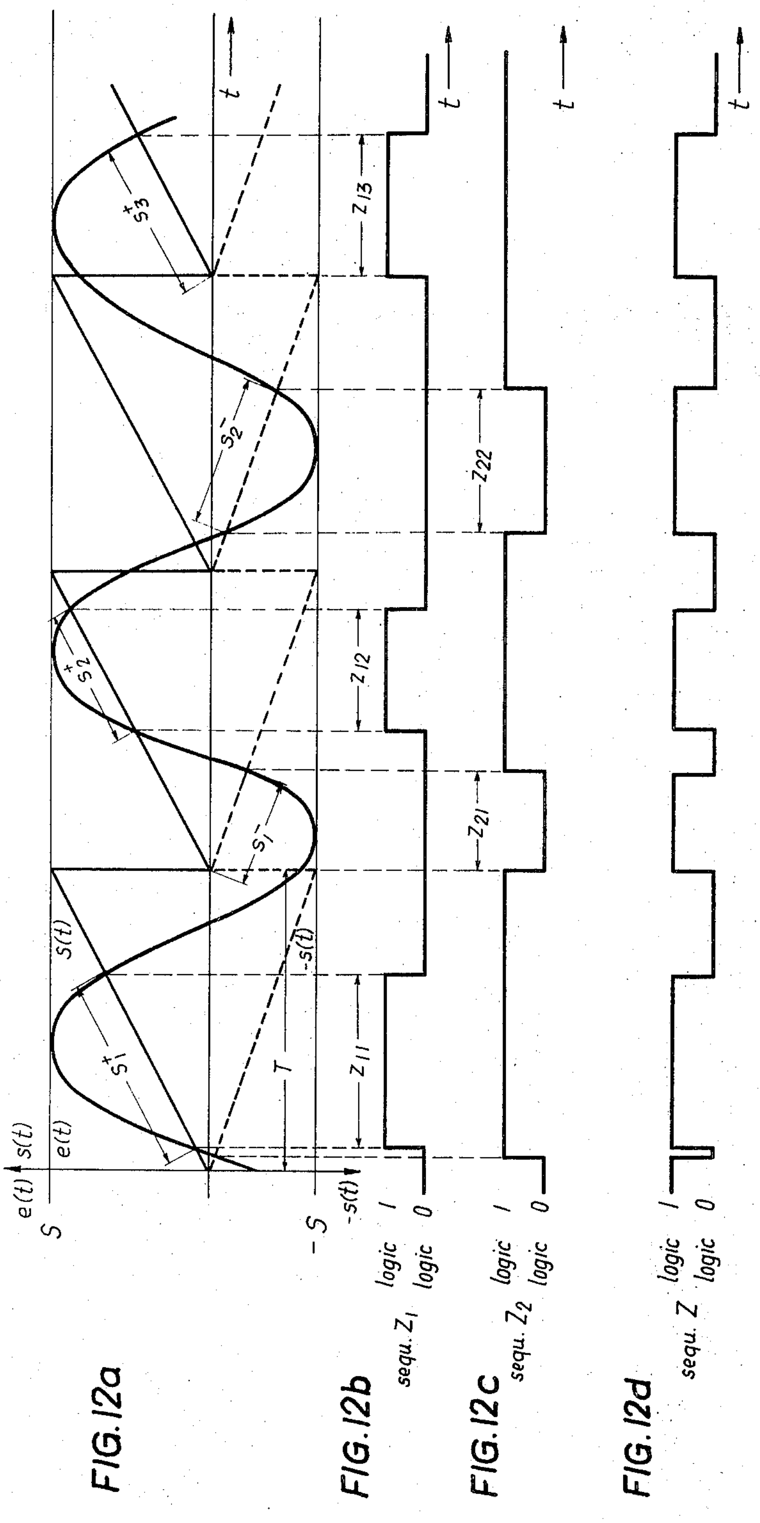

The measured value $e(t)$ is fed to units 3*a* and 3*b* in FIG. 11*a* which compare $e(t)$ with their comparison potentials which are the saw-tooth potentials $s(t)$ and $-s(t)$. The latter are obtained from the threshold-value generator 4'''. FIGS. 12*a* through 12*c* show the decision diagram of units 3*a* and 3*b* and also their output pulse series $Z_1$ and $Z_2$, for the case of a saw-tooth-like threshold-value potential.

As shown in FIG. 12*b*, the unit 3*a* will provide a potential corresponding to the state logic 1 so long $e(t)$ remains larger than the saw-tooth potential $s(t)$, otherwise its output potential will correspond to the state logic 0.

Similar considerations apply to unit 3*b* with respect to FIG. 12*c*. The series of potential changes at the outputs of units 3*a* and 3*b* each form one binary pulse sequence, the logic equivalents of which are denoted as $Z_1$ and $Z_2$ resp. Mathematically, these conditions for unit 3*a* may be expressed as $$e(t) \geq s(t) \rightarrow Z_1{:=}1$$
$$e(t) < s(t) \rightarrow Z_1{:=}0 \qquad 25.$$

where $s(t) \leq 0$,
and for unit 3*b* they may be expressed as $$e(t) \geq -s(t) \rightarrow Z_2{:=}1$$
$$e(t) < -s(t) \rightarrow Z_2{:=}0 \qquad 26.$$

where $-s(t) \leq 0$

Simultaneous consideration of the inequalities (25) and (26) shows that $Z_1{:=}1$ implies $Z_2{:=}1$ and that $Z_2{:=}0$ implies $Z_1{:=}0$. The two series $Z_1$ and $Z_2$ are combined in FIG. 11*a* in a combining network 10, for instance an equivalence circuit, into a resultant 0-1-sequence Z. The following truth table holds for such kind of logic combining:

| $Z_1$ | $Z_2$ | Z |
|---|---|---|
| 0 | 0 | 1 |
| 0 | 1 | 0 |
| 1 | 0 | 0 |
| 1 | 1 | 1 |

For the periodic signal $e(t)$ shown in FIG. 12*a* in connection with a saw-tooth potential $s(t)$ or $-s(t)$, the described logic decision or combining evolution means, when illustrated, that the pulse lengths $z_{1i}$ and $z_{2i}(i{=}1,2. . .)$ of series $Z_1$ and $Z_2$ are proportional to chords of slope $\pm S/T$ $s_i+$ and $s_i^-$ which were cut out of the signal $e(t)$ by the saw-tooth potentials $s(t)$ and $-s(t)$ resp. If the signal $e(t)$ and the saw-tooth potential $s(t)$ are incommensurable with respect to their spectrum frequencies, the series $Z_1$ will be made up of pulses the lengths $z_{1i}$ of which on the average will correspond to all possible chords $s_i^+$ of the positive signal parts, while the pulse lengths $z_{2i}$ of $Z_2$ in similar manner correspond to all possible chords $s_i^-$ of the negative signal parts. The relative frequency of occurrence of the state "logic 1" in $Z_1$ yields therefore a value proportional to the arithmetic mean of the positive signal parts, and the corresponding frequency in $Z_2$ the corresponding value of the negative signal parts, though with a positive sign. After the equivalent combining of $Z_1$ and $Z_2$ into Z, one may see from FIG. 12*d* that the relative frequency of the state "logic 1" in Z has a value proportional to the arithmetic mean of the absolute value of signal $e(t)$. The former value corresponds to full-wave rectification of $e(t)$. Thus there is a binary series in Z with the property of a relative state frequency for "logic 1" and corresponding to the DC value of the measured signal e(t). FIG. 11*b* shows another possibility, an analog-digital conversion with functional rectification.

The last application to be discussed for the circuit arrangement according to the invention is the analog-digital conversion for transformed measured signals. Because of probability theory considerations, one may show that a converter, such as is shown with its control in FIG. 13, provides a binary series Z of which the relative pulse frequency corresponds to the time average of the measured signal $e(t)$ which has been transformed by the amplitude spectrum $p(v)$ of the threshold-value potential $v(t)$. With respect to the mathematical background, the relevant literature is referred to. These relations also apply for a periodic potential $v(t)$, in which case the amplitude spectrum P($v$) may be stated in the form of its inverse function $(v)^{-1}$. It is evident from the representation of FIG. 13 that such a circuit arrangement may be extended to several input signals and to several function transforms.

What is claimed is:

1. Apparatus for converting analog electrical signals to a digital electrical signal wherein the statistical probability of a predetermined state for said digital signal is a predetermined function of said analog signals thus providing a digital representation of said analog signals that has improved digital transmission capabilities, said apparatus comprising:

source means for providing said analog electrical signals, varying threshold signal generator means for providing a continuous threshold electrical signal having a predetermined statistical distribution of amplitude values over a predetermined range of values, and comparison and decision means having two inputs respectively connected to receive said analog electrical signals and said threshold electrical signal and an output for supplying said digital electrical signal which digital signal changes between distinct states as a function of a predetermined comparison made between the analog electrical signals and said threshold electrical signal whereby the statistical probability of existence for a predetermined state of said digital signal is a predetermined function of said analog signals corresponding to said predetermined statistical distribution of amplitude values in said continuous varying threshold electrical signal.

2. Apparatus as in claim 1 wherein said varying threshold signal generator means includes means for causing said predetermined statistical distribution of amplitude values to be a constant uniform distribution whereby the statistical probability of existence for said predetermined state of said digital signal is linearly related to the magnitude of said analog signals.

3. Apparatus as in claim 2 wherein said varying threshold signal generator means comprises a sawtooth signal generator.

4. Apparatus as in claim 2 wherein said varying threshold signal generator means comprises a stochastic signal generator for generating a continuous stochastically varying threshold signal.

5. Apparatus as in claim 1 wherein said varying threshold signal generator comprises a stochastic signal generator for generating a continuous stochastically varying threshold signal.

6. Apparatus as in claim 5 wherein said varying threshold signal generator includes means for causing the continuous stochastically varying threshold signal to correspond to a predetermined transform to be used with respect to said analog input signals.

7. Apparatus as in claim 5 wherein the stochastically varying threshold signal is statistically independent of said analog signals.

8. Apparatus as in claim 1 wherein said varying threshold signal generator means includes means for causing said predetermined statistical distribution of amplitude values to correspond to predetermined transform function to be applied to said analog signals.

9. Apparatus as in claim 1, wherein said comparison and decision means comprises an amplitude discriminator having two different output states depending on which input is greater than the other.

10. Apparatus as in claim 1 further comprising:

a synchronizing clock generator means for supplying periodic trigger signals, and wherein said comparison and decision means includes sampling means connected to be controlled by said trigger signals and to cause said digital electrical signals to comprise a sequence of pulses/no-pulses occurring at time intervals corresponding to the occurrence of said trigger signals.

11. Apparatus for converting analog electrical signals to a digital electrical signal wherein the statistical probability of a predetermined state for said digital signal is a predetermined function of said analog signals thus providing a digital representation of said analog signals that has improved digital transmission capabilities, said apparatus comprising:

first source means for providing a first analog electrical signal, first varying threshold signal generator means for providing a first continuous varying threshold electrical signal having a predetermined statistical distribution of amplitude values over a predetermined range of values, first comparison and decision means having two inputs respectively connected to receive said first analog electrical signals and said first threshold electrical signal and an output for supplying a first digital electrical output signal which digital signal changes between distinct states as a function of a predetermined comparison made between the first analog electrical signal and said first threshold electrical signal whereby the statistical probability of existence for a predetermined state of said first digital signal is a predetermined function of said first analog signal corresponding to said predetermined statistical distribution of amplitude values in said first continuous varying threshold electrical signal, second source means for providing a second analog electrical signal, second varying threshold signal generator means for providing a second continuous varying threshold electrical signal having a predetermined statistical distribution of amplitude values over a predetermined range of values, second comparison and decision means having two inputs respectively connected to receive said second analog electrical signal and said second threshold electrical signal and an output for supplying a second digital electrical output signal which digital signal changes between distinct states as a function of a predetermined comparison made between the second analog electrical signal and said second threshold electrical signal whereby the statistical probability of existence for a predetermined state of said second digital signal is a predetermined function of said second analog signal corresponding to said predetermined statistical distribution of amplitude values in said second continuous varying threshold electrical signal, and logic combining means connected to separately receive the digital signals from each of said first and second comparison and decision means and to produce a common digital output signal as a predetermined logical combination thereof whereby the probability of existence for a predetermined state of the common digital output is a predetermined function of the plurality of analog signals input to the apparatus.

12. Apparatus as in claim 11, further comprising:

at least one synchronizing clock generator means for supplying periodic trigger signals, and wherein at least one of said comparison and decision means and said logic combining means includes sampling means connected to be controlled by said trigger signals and to cause said common digital output to comprise a sequence of pulses/no-pulses occurring at time intervals corresponding to the occurrence of said trigger signals.

13. Apparatus as in claim 11 wherein the logic combining network comprises time averaging devices and differential amplifiers, the inputs of the differential amplifiers being connected to the outputs of corresponding time averaging devices' outputs and wherein the outputs of said differential amplifiers are fed back as respectively corresponding varying threshold signals.

14. Apparatus as in claim 11 wherein the logic combining network comprises time averaging devices, differential amplifiers and reference sources, wherein at least one of the inputs of a differential amplifier is connected with the output of one time-averaging device and wherein the other input of the last-mentioned differential amplifier is connected to the output of a reference source.

15. Apparatus as in claim 11 wherein the logic combining circuit comprises a regulating circuit, the adjusted magnitude analog output of which is connected back as an analog input to at least one respectively corresponding comparison and decision means.

* * * * *